United States Patent [19]

Eckel et al.

[11] Patent Number: 5,393,835
[45] Date of Patent: Feb. 28, 1995

[54] POLYCARBONATE/ABS MOLDING COMPOUNDS

[75] Inventors: Thomas Eckel, Dormagen; Dieter Wittmann, Cologne; Gerhard Fennhoff, Willich; Jochen Schoeps, Krefeld; Karl-Heinz Ott, Leverkusen; Wolfgang Jakob, Moers, all of Germany

[73] Assignee: Bayer Aktiengesellschaft, Leverkusen, Germany

[21] Appl. No.: 63,382

[22] Filed: May 18, 1993

[30] Foreign Application Priority Data

May 21, 1992 [DE] Germany .............. 4216758

[51] Int. Cl.⁶ .............................. C08L 69/00
[52] U.S. Cl. ........................... 525/67; 525/462
[58] Field of Search ................... 525/67, 462

[56] References Cited

U.S. PATENT DOCUMENTS

| | | | |
|---|---|---|---|
| 3,166,606 | 1/1965 | Reinking et al. | 260/860 |
| 4,186,154 | 1/1980 | Binsack et al. | 525/461 |
| 4,804,708 | 2/1989 | Wittman | 525/67 |
| 5,045,582 | 9/1991 | Hashimoto et al. | 524/156 |
| 5,162,419 | 11/1992 | Pottier-Metz | 525/67 |

FOREIGN PATENT DOCUMENTS

| | | |
|---|---|---|
| 498406 | 8/1992 | European Pat. Off. . |
| 1170141 | 5/1964 | Germany . |
| 4014308 | 11/1991 | Germany . |
| 023444 | 2/1985 | Japan ................. 525/462 |
| 203666 | 10/1985 | Japan ................. 525/462 |
| 243655 | 10/1991 | Japan . |
| 1586910 | 3/1981 | United Kingdom . |

OTHER PUBLICATIONS

Chem Abstract 116(26):256891j: 1991.
Database WPI – AN 83-773236 (Idemitsu Kosan KK) Aug. 17, 1983.
Database WPI – AN 81-43185D (Mitsubishi Chem Ind KK) Apr. 25, 1981.

*Primary Examiner*—David Buttner
*Attorney, Agent, or Firm*—Joseph C. Gil; Aron Preis

[57] ABSTRACT

1. Thermoplastic molding compounds containing

A. 5 to 95 parts by weight of an aromatic polycarbonate,

B. 1 to 50 parts by weight of a vinyl copolymer and

C. 5 to 95 parts by weight of one or more graft polymers obtained by graft polymerization, characterized in that 10 to 100% of component A is replaced by a mixture of two polycarbonates A.1 and A.2 of identical structure, 1) the relative solution viscosity of A.1 being 1.18 to 1.24,
2) the relative solution viscosity of A.2 being 1.24 to 1.34 and
3) the difference between the relative solution viscosities of A.1 and A.2 being greater than or equal to 0.06

7 Claims, No Drawings

POLYCARBONATE/ABS MOLDING COMPOUNDS

This invention relates to thermoplastic molding compounds consisting o aromatic polycarbonates, vinyl copolymers and graft copolymers.

Thermoplastic molding compounds of polycarbonates and ABS polymers have been known for some time. For example, DE-A 1 170 141 describes the favorable processing properties of molding compounds of polycarbonate and graft polymers of monomer mixtures of acrylonitrile and an aromatic vinyl hydrocarbon on polybutadiene.

However, it has been found that the processing behavior of polycarbonate/ABS molding compounds is unsatisfactory for a number of complicated thin-walled parts.

An improvement in the flow behavior of polycarbonate/ABS molding compounds can be achieved, for example, with certain additives (flow aids) or by using polycarbonate and/or styrene/acrylonitrile resins of relatively low molecular weight.

Unfortunately, other important properties, for example heat resistance, are adversely affected by the addition of low molecular weight flow aids. The drastically decreasing strength of the molding compounds, above all at low temperatures, is the limiting factor in the reduction of the molecular weight of the resin components.

The object of the present invention was to provide free-flowing polycarbonate/ABS molding compounds which would not be adversely affected in their other properties.

It has now surprisingly been found that the use of certain mixtures of polycarbonates differing distinctly in their solution viscosities in polycarbonate/ABS molding compounds results in flow properties that are better than would be expected from the use of a polycarbonate of average solution viscosity. The mechanical properties, such as notched impact strength or Vicat softening temperature, remain at the same high level. One particular advantage of the present invention is that a recycled polycarbonate can be used as one of the two polycarbonate components A.1 or A.2.

The present invention relates to thermoplastic molding compounds containing

A. 5 to 95 parts by weight, preferably 10 to 90 parts by weight and, more preferably, 20 to 80 parts by weight of an aromatic polycarbonate, B. 1 to 50 parts by weight, preferably 2 to 30 parts by weight and, more preferably, 8 to 25 parts by weight of a vinyl copolymer of B.1 50 to 99 parts by weight styrene, α-methyl styrene, nucleus-substituted styrenes, methyl methacrylate or mixtures thereof and B.2 1 to 50 parts by weight (meth) acrylonitrile, methyl methacrylate, maleic anhydride, N-alkyl- or N-aryl-substituted maleic imide or mixtures thereof and C. 5 to 95 parts by weight, preferably 7 to 80 parts by weight and, more preferably, 10 to 70 parts by weight of one or more graft polymers obtained by graft polymerization of C.1 5 to 95 parts by weight and preferably 30 to 80 parts by weight of a mixture of C.1.1 50 to 99 parts by weight styrene, α-methyl styrene, nucleus-substituted styrenes, $C_{1-8}$ alkyl methacrylates, $C_{1-8}$ alkyl acrylates or mixtures thereof and C.1.2 1 to 50 parts by weight acrylonitrile, methacrylonitrile, $C_{1-8}$ alkyl methacrylates, $C_{1-8}$ alkyl acrylates, maleic anhydride, $C_{1-4}$ alkyl- or phenyl-N-substituted maleic imides or mixtures thereof on C.2 5 to 95 parts by weight and preferably 20 to 70 parts by weight of a crosslinked, particulate elastomeric graft base having an average particle diameter ($d_{50}$ value) of 0.05 to 5 μm and preferably 0.1 to 0.6 μm and a glass transition temperature of $<10°$ .C and preferably $<-10°$ C., the sum of the parts by weight of A, B and C being 100 parts by weight, characterized in that 10 to 100% and preferably 20 to 70% of component A is replaced by a mixture of two polycarbonates A.1 and A.2 of identical structure, 1) the relative solution viscosity of A.1 being 1.18 to 1.24, 2) the relative solution viscosity of A.2 being 1.24 to 1.34 and 3) the difference between the relative solution viscosities of A.1 and A.2 being greater than or equal to 0.06.

Component A

Preferred polycarbonates of component A are those based on diphenols corresponding to formula (I)

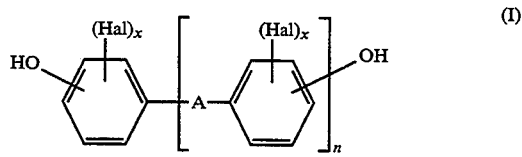

in which
A is a single bond, a $C_{1-5}$ alkylene, a $C_{2-5}$ alkylidene, a $C_{5-6}$ cycloalkylidene, —S— or —$SO_2$—.
Hal is chlorine or bromine,
x is 0, 1 or 2 and
n is 1 or 0.

Polycarbonates suitable in accordance with the invention for component A are both homopolycarbonates and copolycarbonates.

Component A may also consist of mixtures of the thermoplastic polycarbonates defined above.

The production of the polycarbonates suitable in accordance with the invention for component A is known from the literature and may be carried out, for example, with phosgene by the interfacial process or with phosgene by the process in homogeneous solution, the so-called pyridine process. The particular molecular weight to be established is obtained in known manner by addition of a suitable quantity of known chain terminators.

Suitable chain terminators are, for example, phenol, p-chlorophenol, p-tert.butylphenol or 2,4,6-tribromophenol and also long-chain alkylphenols, such as 4-(1,3-tetramethylbutyl)-phenol according to DE-OS 2 842 005, or monoalkylphenol or dialkylphenols containing a total of 8 to 20 carbon atoms in the alkyl substituents according to DE-OS 3 506 472, such as 3,5-di-tert.butylphenol, p-isooctylphenol, p-tert.octylphenol, p-dodecylphenol and 2-(3,5-dimethylheptyl)-phenol and 4 -(3,5 -dimethylheptyl)-phenol.

The quantity of chain terminators to be used is generally between 0.5 and 10 mol- %, based on the sum total of the diphenols (I) used.

The polycarbonates suitable in accordance with the invention for component A have average weight average molecular weights ($\overline{M}w$, as measured for example by ultracentrifugation or scattered light measurement) in the range from 10,000 to 200,000 and preferably in the range from 20,000 to 80,000.

The relative solution viscosities, as measured in $CH_2Cl_2$ as solvent at 25° C. and at a concentration of 0.5 g/100 ml, of the polycarbonates suitable in accordance with the invention is typically in the range from 1.18 to 1.34.

Suitable diphenols corresponding to formula (I) are, for example, hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)cyclohexane, 2,2-bis-(3-chloro-4-hydroxyphenyl)-propane, 2,2 -bis -(dibromo-4-hydroxyphenyl)-propane.

Preferred diphenols corresponding to formula (I) are 2,2-bis-(4-hydroxyphenyl)-propane, 2,2-bis-(3,5-dichloro-4-hydroxyphenyl)-propane and 1,1 -bis -(4 -hydroxyphenyl )cyclohexane.

Other preferred polycarbonates for component A are those based on alkyl-substituted dihydroxydiphenyl cycloalkanes corresponding to formula (II)

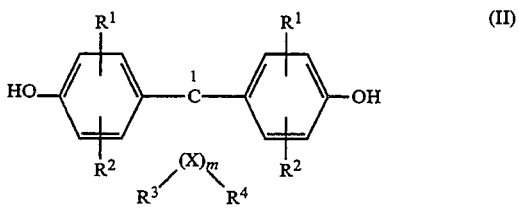

in which
$R^1$ and $R^2$ independently of one another represent hydrogen, halogen, preferably chlorine or bromine, $C_{1-8}$ alkyl, preferably methyl or ethyl, $C_{5-6}$ cycloalkyl, $C_{6-10}$ aryl, preferably phenyl, and $C_{7-12}$ aralkyl, preferably biphenyl $C_{1-4}$ alkyl, more particularly benzyl,
m is an integer of 4 to 7, preferably 4 or 5,
$R^3$ and $R^4$ may be individually selected for each X and, inpendently of one another, represent hydrogen or $C_{1-6}$ alkyl, preferably hydrogen, methyl or ethyl,
and
X is a hydrocarbon, with the proviso that, at at least one atom X, $R^3$ and $R^4$ are both alkyl.

Preferred diphenols corresponding to formula (II) are dihydroxydiphenyl cycloalkanes containing 5 and 6 ring carbon atoms in the cycloaliphatic radical (m=4 or 5 in formula (II)), such as for example diphenols corresponding to the following formulae

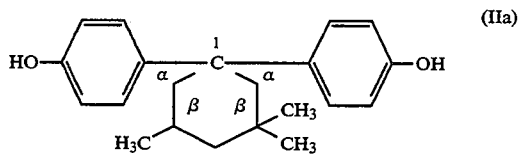

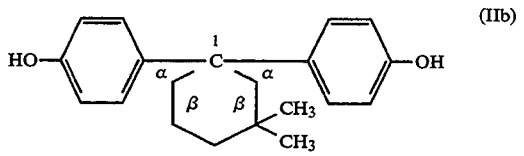

and

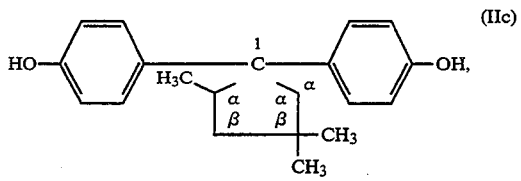

1,1-bis-(4-hydroxyphenyl)-3,3,5-trimethyl cyclohexane (formula IIa) being particularly preferred.

The polycarbonates suitable in accordance with the invention for component A may be branched in known manner, preferably by the incorporation of 0.05 to 2.0 tool- %, based on the sum of the diphenols used, of trifunctional or more than trifunctional compounds, for example those containing three or more than three phenolic groups, for example phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri -(4-hydroxyphenyl)-phenylmethane, 2,2-bis-(4,4-bis-(4-hydroxyphenyl)-cyclohexyl)-propane, 2,4-bis-(4-hydroxyphenylisopropyl)-phenol, 2,6-bis-(2-hydroxy-5'-methylbenzyl)-4-methylphenol, 2-(4-hydroxypheny)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

In addition to bisphenol A homopolycarbonate, preferred polycarbonates are the copolycarbonates of bisphenol A with up to 15 mol- %, based on the total mols of diphenols, of 2,2-bis-(3,5-dibromo-4-hydroxyphenyl)-propane.

The aromatic polycarbonates of component A may be partly replaced by aromatic polyester carbonates.

According to the invention, 10 to 100% and preferably 20 to 70% of the aromatic polycarbonate A may be replaced by a mixture of two polycarbonates A.1 and A.2 of identical structure. Both the polycarbonates A.1 and A.2 and the polycarbonate A preferably have identical structures.

Based on the mixture of polycarbonates A.1 and A.2, the percentage by weight of A.1 is from 5 to 95% by weight, preferably from 25 to 75% by weight and, more preferably, 10 to 35% by weight while the percentage by weight of A.2 is from 95 to 5% by weight, preferably from 75 to 25% by weight and, more preferably, from 35 to 10% by weight.

The mixture of polycarbonates A.1 and A.2 is distinguished by the fact that the relative solution viscosity of A.1 is between 1.18 and 1.24, the relative solution viscosity of A.2 is between 1.24 and 1.34 and the difference between the relative solution viscosities of A.1 and A.2 is greater than or equal to 0.06 and, more particularly, greater than or equal to 0.09, i.e. relative solution viscosity (A.2) - relative solution viscosity (A.1)$\geq$0,06, more particularly $\geq$0,09.

The relative solution viscosity is measured in $CH_2Cl_2$ as solvent at 25° C. and at a concentration of 0.5 g/100 ml.

In one particularly preferred embodiment of the invention, at least one of the two polycarbonate components A.1 and A.2 in the mixture is a recycled polycarbonate. In the context of the invention, a recycled polycarbonate is understood to be a product which has already undergone a processing and life cycle and which has been freed from adhering impurities by special working-up processes so that it is suitable for further applications.

Component B

The thermoplastic polymer B may be selected from homopolymers or copolymers of one or more ethylenically unsaturated monomers (vinyl monomers), such as for example styrene, α-methyl styrene, nucleus-substituted styrenes, acrylonitrile, methacrylonitrile, methyl methacrylate, maleic anhydride, N-substituted maleic imides and (meth)acrylates containing 1 to 18 carbon atoms in the alcohol component.

The copolymers of component B are resin-like, thermoplastic and rubber-free.

Preferred vinyl copolymers B are those of at least one monomer from the group consisting of styrene, α-methyl styrene and/or nucleus-substituted styrene (B.1) with at least one monomer from the group consisting of acrylonitrile, methacrylonitrile, methyl methacrylate, maleic anhydride and/or N-substituted maleic imide (B.2).

Particularly preferred ratios by weight in the thermoplastic plastic copolymer B are 60 to 95% by weight B.1 and 40 to 5% by weight B.2.

Particularly preferred copolymers B are those of styrene with acrylonitrile and optionally with methyl methacrylate; copolymers of α-methyl styrene with acrylonitrile and optionally with methyl methacrylate or copolymers of styrene and α-methyl styrene with acrylonitrile and optionally with methyl methacrylate.

The styrene/acrylonitrile copolymers of component B are known and may be produced by radical polymerization, more particularly by emulsion, suspension, solution or bulk polymerization. The copolymers of component B preferably have molecular weights $\overline{M}_w$ (weight average, as determined by light scattering or sedimentation) in the range from 15,000 to 200,000.

Other particularly preferred copolymers B according to the invention are statistical copolymers of styrene and maleic anhydride which may advantageously be produced from the corresponding monomers by continuous bulk or solution polymerization with incomplete conversions.

The percentage contents of the two components of the statistical styrene/maleic anhydride copolymers suitable in accordance with the invention may be varied within wide limits. The preferred maleic anhydride content is between 5 and 25% by weight.

Instead of styrene, the polymers may also contain nucleus-substituted styrenes, such as p-methyl styrene, 2,4-dimethyl styrene and other substituted styrenes, such as α-methyl styrene.

The molecular weights (number averages $\overline{M}_n$) of the statistical styrene/maleic anhydride copolymers suitable in accordance with the invention for component B may be varied over a wide range, the range from 60,000 to 200,000 being preferred. A limiting viscosity of 0.3 to 0.9 (as measured in dimethyl formamide at 25° C.; see Hoffmann, Krömer, Kuhn, Polymeranalytik I, Stuttgart 1977, pages 316 et seq.) is preferred for these products.

Component C

Component C according to the invention is a graft polymer. The graft polymers in question include graft copolymers having rubber-elastic properties which may essentially be obtained from at least two of the following monomers: chloroprene, 1,3-butadiene, isoprene, styrene, acrylonitrile, ethylene, propylene, vinyl acetate and (meth) acrylates containing 1 to 18 carbon atoms in the alcohol component; i.e. polymers of the type described, for example, in "Methoden der Organischen Chemie" (HoubenWeyl), Vol. 14/1, Georg Thieme Verlag, Stuttgart 1961, pages 393–406 and in C. B. Bucknall, "Toughened Plastics", Appl. Science Publishers, London 1977. Preferred polymers C are partly crosslinked and have gel contents of more than 20% by weight, preferably more than 40% by weight and, more preferably, more than 60% by weight.

Preferred graft polymers C include graft polymers of:
C.1 5 to 95 and preferably 30 to 80 parts by weight of a mixture of C.1.1 50 to 99 parts by weight styrene, α-methyl styrene, halogen- or methyl-nucleus-substituted styrenes, methyl methacrylate or mixtures of these compounds and C.1.2 1 to 50 parts by weight acrylonitrile, methacrylonitride, methyl methacrylate, maleic anhydride, $C_{1-4}$ alkyl- or phenyl-N-substituted maleic imides or mixtures of these compounds on C.2 5 to 95 and preferably 20 to 70 parts by weight diene- and/or alkylacrylate-based polymer having a glass transition temperature below −10° C.

Preferred graft polymers C are, for example, bases C.2 grafted with styrene and/or acrylonitrile and/or alkyl (meth) acrylates, such as polybutadienes, butadiene/styrene copolymers and acrylate rubbers; i.e. copolymers of the type described in DE-OS 1 694 173 (=U.S. Pat. No. 3,564,077); polybutadienes, butadiene/styrene or butadiene/acrylonitrile copolymers, polyisobutenes or polyisoprenes grafted with alkyl acrylates or methacrylates, vinyl acetate, acrylonitrile, styrene and/or with alkyl styrenes, as described for example in DE-OS 2 348 377 (=U.S. Pat. No. 3,919,353).

Particularly preferred polymers C are, for example, ABS polymers of the type described, for example, in DE-OS 2 035 390 (=U.S. Pat. No. 3,644,574) or in DE-OS 2 248 242 (=GB-PS 1,409,275).

Particularly preferred graft polymers C are obtainable by grafting

β10 to 70, preferably 15 to 50 and, more preferably, 20 to 40% by weight, based on graft polymer C, of at least one (meth) acrylate or 10 to 70, preferably 15 to 50 and, more preferably, 20 to 40% by weight of a mixture of 10 to 50, preferably 20 to 35% by weight, based on mixture, of acrylonitrile or (meth)acrylates and 50 to 90, preferably 65 to 80% by weight, based on mixture, of styrene as the graft shell C.1 onto α30 to 90, preferably 50 to 85 and, more preferably, 60 to 80% by weight, based on graft polymer C, of a butadiene polymer containing at least 50% by weight, based on β, butadiene units as the graft base C.2, the gel content of the graft β being at least 70% by weight (as measured in toluene), the degree of grafting G being between 0.15 and 0.55 and the average particle diameter $d_{50}$ of the graft polymer C.2 being between 0.05 and 2 μm and preferably between 0.1 and 0.6 μm.

(Meth) acrylates α are esters of acrylic acid or methacrylic acid and monohydric alcohols containing 1 to 18 carbon atoms. Methyl, ethyl and propyl methacrylate, n-butyl acrylate, t-butyl acrylate and t-butyl methacrylate are particularly preferred.

In addition to butadiene units, the graft base β may contain up to 50% by weight, based on β, of units of other ethylenically unsaturated monomers, such as styrene, acrylonitrile, esters of acrylic or methacrylic acid containing 1 to 4 carbon atoms in the alcohol component (such as methyl acrylate, ethyl acrylate, methyl methacrylate, ethyl methacrylate), vinyl esters and/or vinyl ethers. The preferred graft base β consists of pure polybutadiene.

Since the graft monomers do not have to be completely grafted onto the graft base in the grafting reaction, graft polymers C in the context of the invention are also understood to include products which are obtained by polymerization of the graft monomers in the presence of the graft base.

The degree of grafting G is the ratio by weight of graft monomers grafted on to the graft base and is dimensionless.

The average particle size ds0 is the diameter above which 50% by weight of the particles and below which 50% by weight of the particles lie. It can be determined by ultracentrifuge measurement (W. Scholtan, H. Lange, Kolloid Z. und Z. Polymere 250 (1972), 782–796).

Other particularly preferred polymers C are, for example, graft polymers of

τ 20 to 90% by weight, based on C, acrylate rubber having a glass transition temperature below −20° C. as the graft base C.2 and δ 10 to 80% by weight, based on C, of at least one polymerizable, ethylenically unsaturated monomer, of which the homopolymer (s) or copolymer (s) formed in the absence of C.2 would have a glass transition temperature above 25° C., as the graft monomer C.1.

The acrylate rubbers τ of the polymers C are preferably polymers of alkyl acrylates, optionally with up to 40% by weight, based on τ, of other polymerizable, ethylenically unsaturated monomers. Preferred polymerizable acrylic acid esters include $C_{1-8}$ alkyl esters, for example methyl, ethyl, butyl, n-octyl and 2-ethylhexyl ester; haloalkyl esters, preferably halo-$C_{1}$-alkyl esters, such as chloroethyl acrylate, and mixtures of these monomers.

For crosslinking, monomers containing more than one polymerizable double bond may be copolymerized. Preferred examples of crosslinking monomers are esters of unsaturated monocarboxylic acids containing 3 to 8 carbon atoms and unsaturated monohydric alcohols containing 3 to 12 carbon atoms or saturated polyols containing 2 to 4 OH groups and 2 to 20 carbon atoms, such as for example ethylene glycol dimethylacrylate, allyl methacrylate; polyunsaturated heterocyclic compounds, such as for example trivinyl and triallyl cyanurate; polyfunctional vinyl compounds, such as di- and trivinyl benzenes; and also triallyl phosphate and diallyl phthalate.

Preferred crosslinking monomers are allyl methacrylate, ethylene glycol dimethacrylate, diallyl phthalate and heterocyclic compounds containing at least three ethylenically unsaturated groups.

Particularly preferred crosslinking monomers are the cyclic monomers triallyl cyanurate, triallyl isocyanurate, trivinyl cyanurate, triacryloyl hexahydro-s-triazine, triallyl benzenes.

The quantity of the crosslinked monomers is preferably between 0.02 and 5% by weight and more preferably between 0.05 and 2% by weight, based on the graft base τ.

In the case of cyclic crosslinking monomers containing at least three ethylenically unsaturated groups, it is of advantage to limit the quantity to below 1% by weight of the graft base τ.

Preferred "other" polymerizable, ethylenically unsaturated monomers which may optionally be used in addition to the acrylates for the production of the graft base τ are, for example, acrylonitrile, styrene, α-methyl styrene, acrylamides, vinyl $C_{1-6}$ alkyl ethers, methyl methacrylate, butadiene. Preferred acrylate rubbers as the graft base τ are emulsion polymers having a content of at least 60% by weight.

Other suitable graft bases C.2 are silicone rubbers containing graft-active sites of the type described in DE-OS 3 704 657, DE-OS 3 704 655, DE-OS 3 631 540 and DE-OS 3 631 539.

The gel content of the graft base C.2 is determined in dimethyl formamide at 25° C. (M. Hoffmann, H. Krömer, R. Kuhn, Polymeranalytik I und II, Georg Thieme-Verlag, Stuttgart 1977).

The graft polymers C may be produced by known methods, such as bulk, suspension, emulsion or bulk suspension polymerization.

In addition, the molding compounds according to the invention may contain other known additives, such as stabilizers, pigments, mold release agents, flow aids, flameproofing agents, antistatic agents, fillers and reinforcing materials, in the usual quantities.

Preferred additives in the context of the invention are flameproofing agents. Both halogen-containing compounds, such as chlorine and/or bromine compounds, and also halogen-free compounds, such as phosphorus compounds, are suitable flameproofing agents.

The molding compounds according to the invention may be produced by mixing the constituents in known manner and melt-compounding or melt-extruding the resulting mixture at elevated temperatures, preferably at 200 to 350° C., in standard machines, such as internal kneaders, extruders or twin-screw extruders. The individual components may be mixed successively or simultaneously.

Accordingly, the present invention also relates to a process for the production of the described molding compounds by mixing the components at elevated temperature.

The molding compounds according to the invention may be used for the production of moldings of all kinds, for example by injection molding. Examples of moldings are housing parts (for example for domestic appliances, such as juice presses, coffee machines, mixers), cover panels for the building industry or automotive parts. In addition, they may be used for electrical equipment, for example for multiway connectors, because they have very good electrical properties.

Moldings can also be produced by thermoforming from prefabricated sheets or films.

Accordingly, the present invention also relates to the use of the described molding compounds for the production of moldings.

The present invention also relates to the use of recycled polycarbonate in the thermoplastic molding compounds mentioned above.

EXAMPLES

Component A

A.

Linear polycarbonate based on bisphenol A having a relative solution viscosity of 1.2547, as measured in $CH_2Cl_2$ as solvent at 25° C. and in a concentration of 0.5 g/100 ml.

A.1 Linear polycarbonate based on bisphenol A having a relative solution viscosity of 1.2095, as measured in $CH_2Cl_2$ as solvent at 25° C. and in a concentration of 0.5 g/100 ml.

A.2.1 Linear polycarbonate based on bisphenol A having a relative solution viscosity of 1.3074, as measured in $CH_2Cl_2$ as solvent at 25° C. and in a concentration of 0.5 g/100 ml.

A.2.2 Linear polycarbonate based on bisphenol A having a relative solution viscosity of 1.3254, as measured in $CH_2Cl_2$ as solvent at 25° C. and in a concentration of 0.5 g/100 ml.

Component B

Styrene/acrylonitrile copolymer with a ratio of styrene to acrylonitrile of 72:28 and a limiting viscosity of 0.55 dl/g (as measured in dimethyl formamide at 20° C.).

Component C

Graft polymer of 45 parts by weight of a copolymer of styrene and acrylonitrile (ratio 72:28) on 55 parts by weight particulate crosslinked butadiene rubber (average particle diameter $d_{50}=0.4$ μm) prepared by emulsion polymerization.

Production and testing of the molding compounds according to the invention

Components A, B and C were melted and homogenized in a 3 liter internal kneader at temperatures in the range from 210 to 250° C.

Test specimens measuring $80 \times 10 \times 4$ mm$^3$ (processing temperature 260° C.) were produced from the molding compounds by injection molding and were used to measure notched impact strength (by the ISO 180 method) at room temperature.

Heat resistance (Vicar B softening point) was determined in accordance with DIN 53 460.

To evaluate processing behavior, a viscosity function (melt viscosity as a function of the shear rate) of the molding compounds was recorded in the range from approx. 100 to 1000 s$^{-1}$ at a melt temperature of 260° C. The values for 100, 1000 and 1500 s$^{-1}$ are shown in the Table.

The properties of the molding compounds according to the invention are summarized in the following Table.

TABLE 1

Composition and properties of the polycarbonate/ABS molding compounds

| Example | 1 Comparison | 2 | 3 | 4 | 5 | 6 |
|---|---|---|---|---|---|---|
| Components [% by weight] | | | | | | |
| A | 60 | 36 | 30 | 24 | 30 | — |
| A.1 | — | 12 | 15 | 18 | 15 | 30 |
| A.2.1 | — | — | — | — | 15 | 30 |
| A.2.2 | — | 12 | 15 | 18 | — | — |
| B | 16 | 16 | 16 | 16 | 16 | 16 |
| C | 24 | 24 | 24 | 24 | 24 | 24 |
| Properties: | | | | | | |
| Vicat/B$_{120}$ [°C.] | 118 | 119 | 118 | 119 | 120 | 118 |
| Notched impact strength [kJ/m$^2$] | 47 | 46 | 47 | 47 | 46 | 46 |
| Melt viscosity at 260° C. [Pa · s] | | | | | | |
| at 100 s$^{-1}$ | 950 | 780 | 820 | 825 | 720 | 690 |
| at 1000 s$^{-1}$ | 285 | 265 | 265 | 270 | 245 | 245 |
| at 1500 s$^{-1}$ | 220 | 200 | 205 | 210 | 190 | 190 |

It is clear from Table 1 that Examples 2–6 according to the invention offer an optimal property combination of high heat resistance, good notched impact strength and considerably improved flow behavior compared to Example 1.

We claim:

1. Thermoplastic molding compounds containing
A. 5 to 95 parts by weight of an aromatic polycarbonate,
B. 1 to 50 parts by weight of a vinyl copolymer of
    B.1 50 to 99 parts by weight styrene, α-methyl styrene, nucleus-substituted styrenes, methyl methacrylate or mixtures thereof and
    B.2 1 to 50 parts by weight (meth)acrylonitrile, methyl methacrylate, maleic anhydride, N-alkyl- or N-aryl-substituted maleic imide or mixtures thereof
and
C. 5 to 95 parts by weight of one or more graft polymers obtained by graft polymerization of
    C.1 5 to 95 parts by weight of a mixture of
        C.1.1 50 to 99 parts by weight styrene, α-methyl styrene, nucleus-substituted styrenes, $C_{1-8}$ alkyl methacrylates, $C_{1-8}$ alkyl acrylates or mixtures thereof and
        C.1.2 1 to 50 parts by weight acrylonitrile, methacrylonitrile, $C_{1-8}$ alkyl methacrylates, $C_{1-8}$ alkyl acrylates, maleic anhydride, $C_{1-4}$ alkyl- or phenyl-N-substituted maleic imides or mixtures thereof on
    C.2 5 to 95 parts by weight of a crosslinked, particulate elastomeric graft base having an average particle diameter ($d_{50}$ value) of 0.05 to 5 μm and a glass transition temperature of $<10°$ C., the sum of the parts by weight of A, B and C being 100 parts by weight,
characterized in that 10 to 100% of component A is replaced by a mixture of two polycarbonates A.1 and A.2 of identical structure,
1) the relative solution viscosity of A.1 being 1.18 to 1.24,
2) the relative solution viscosity of A.2 being 1.24 to 1.34 and
3) the difference between the relative solution viscosities of A.1 and A.2 being greater than or equal to 0.06 relative solution viscosities being measured in $CH_2Cl_2$ as solvent at 25° C. and at a concentration of 0.5 g polycarbonate/100 ml of solvent.

2. Molding compounds as claimed in claim 1 containing 10 to 90 parts by weight component A, 2 to 30 parts by weight component B and 7 to 80 parts by weight component C.

3. Molding compounds as claimed in claim 1 containing 20 to 80 parts by weight component A, 8 to 25 parts by weight component B and 10 to 70 parts by weight component C.

4. Molding compounds as claimed in claim 1 containing a diene rubber, an acrylate rubber, a silicone rubber or an ethylene/propylene/diene rubber as the graft base C.2.

5. The molding compound of claim 1 wherein 20 to 70% of Component A is replaced by said mixture of two polycarbonates.

6. Molding compounds as claimed in claim 1, characterized in that they contain at least one addition from the group consisting of stabilizers, pigments, mold release agents, flow aids, flameproofing agents, antistatic agents, fillers and reinforcing materials.

7. A process for the production of the molding compounds claimed in claim 1, characterized in that components A, B and C and, optionally, at least one other constituent selected from the group consisting of stabilizers, pigments, mold release agents, flow aids, flameproofing agents, antistatic agents, fillers and reinforcing materials are mixed and the resulting mixture is melt-compounded or melt-extruded at elevated temperatures.

* * * * *